United States Patent
Kim et al.

(10) Patent No.: US 12,377,835 B2
(45) Date of Patent: Aug. 5, 2025

(54) SYSTEM AND METHOD IN VEHICLE PATH PREDICTION BASED ON ODOMETRY AND INERTIAL MEASUREMENT UNIT

(71) Applicant: Canoo Technologies Inc., Torrance, CA (US)

(72) Inventors: Kilsoo Kim, Hermosa Beach, CA (US); Jongmoo Choi, Gardena, CA (US); Siddharth Agarwal, Torrance, CA (US); Emilio Moyers, Torrance, CA (US); Mayukh Sattiraju, Redondo Beach, CA (US); Aviral Singh, Torrance, CA (US); David R. Arft, Torrance, CA (US)

(73) Assignee: CANOO TECHNOLOGIES INC., Torrence, CA (US)

( * ) Notice: Subject to any disclaimer, the term of this patent is extended or adjusted under 35 U.S.C. 154(b) by 671 days.

(21) Appl. No.: 17/449,623

(22) Filed: Sep. 30, 2021

(65) Prior Publication Data

US 2023/0101438 A1 Mar. 30, 2023

(51) Int. Cl.
*B60W 30/045* (2012.01)
*B60W 10/18* (2012.01)
(Continued)

(52) U.S. Cl.
CPC .......... *B60W 30/045* (2013.01); *B60W 10/18* (2013.01); *B60W 10/20* (2013.01);
(Continued)

(58) Field of Classification Search
CPC .... B60W 30/045; B60W 10/18; B60W 10/20; B60W 2420/408
See application file for complete search history.

(56) References Cited

U.S. PATENT DOCUMENTS 5,483,446 A 1/1996 Momose et al.
11,104,336 B2 * 8/2021 Lin .................. G06V 20/58
(Continued)

FOREIGN PATENT DOCUMENTS

EP 0751019 A1 * 1/1997

OTHER PUBLICATIONS

International Search Report and Written Opinion of the International Searching Authority dated Jan. 5, 2023, in connection with International Application No. PCT/US2022/077269, 7 pages.
(Continued)

*Primary Examiner* — David P. Merlino
(74) *Attorney, Agent, or Firm* — ALLEN, DYER, DOPPELT, + GILCHRIST, P.A.

(57) ABSTRACT

An apparatus includes an inertial measurement unit (IMU) configured to detect motion characteristics of a vehicle. The apparatus also includes an odometry system configured to detect a wheel speed of each wheel of the vehicle. The apparatus further includes at least one processor communicatively connected to the IMU and the odometry system, the at least one processor configured to determine first parameters for predicting a path of the vehicle, determine second parameters for predicting the path of the vehicle, and predict the path of the vehicle using a combination of the first parameters and the second parameters, wherein the combination is weighted based on a longitudinal acceleration of the vehicle obtained using the IMU.

16 Claims, 8 Drawing Sheets

(51) Int. Cl.
   *B60W 10/20*   (2006.01)
   *G01P 15/08*   (2006.01)

(52) U.S. Cl.
   CPC . *B60W 2420/403* (2013.01); *B60W 2420/408* (2024.01); *B60W 2520/06* (2013.01); *B60W 2520/105* (2013.01); *B60W 2520/14* (2013.01); *B60W 2520/28* (2013.01); *G01P 15/08* (2013.01)

(56)                References Cited

U.S. PATENT DOCUMENTS

| | | |
|---|---|---|
| 2005/0236894 A1* | 10/2005 | Lu .................... B62D 11/08 303/139 |
| 2010/0023196 A1 | 1/2010 | Huang et al. |
| 2010/0039318 A1* | 2/2010 | Kmiecik ............. G01S 19/23 342/357.65 |
| 2010/0241314 A1* | 9/2010 | Bohm ................ B62D 7/1581 701/41 |
| 2011/0046843 A1 | 2/2011 | Caveney |
| 2019/0163189 A1* | 5/2019 | Jensen ............... G05D 1/0272 |
| 2019/0265714 A1* | 8/2019 | Ball .................. G05D 1/0217 |
| 2021/0046843 A1* | 2/2021 | Maeda ............... B60L 53/64 |

OTHER PUBLICATIONS

Liu, et al., "Research on Curved Path Tracking Control for Four-Wheel Steering Vehicle considering Road Adhesion Coefficient," Hindawi, Mathematical Problems in Engineering, vol. 2020, Article ID 3108589, 19 pages.
Sun, et al., "A Model Predictive Controller with Switched Tracking Error for Autonomous Vehicle Path Tracking," IEEE Access, vol. 7, Apr. 2, 2019, 12 pages.

\* cited by examiner

SYSTEM AND METHOD IN VEHICLE PATH PREDICTION BASED ON ODOMETRY AND INERTIAL MEASUREMENT UNIT

CROSS-REFERENCE TO RELATED APPLICATIONS

This application is related to the subject matter of: U.S. patent application Ser. No. 17/305,701 filed Jul. 13, 2021 and entitled SYSTEM AND METHOD IN THE PREDICTION OF TARGET VEHICLE BEHAVIOR BASED ON IMAGE FRAME AND NORMALIZATION; U.S. patent application Ser. No. 17/305,702 filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17/305,703 filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. patent application Ser. No. 17/305,704 filed Jul. 13, 2021 and entitled SYSTEM AND METHOD IN VEHICLE PATH PREDICTION BASED ON FULL NONLINEAR KINEMATICS; U.S. patent application Ser. No. 17/305,705 filed Jul. 13, 2021 and entitled SYSTEM AND METHOD IN LANE DEPARTURE WARNING WITH FULL NONLINEAR KINEMATICS AND CURVATURE; U.S. patent application Ser. No. 17/305,706 filed Jul. 13, 2021 and entitled SYSTEM AND METHOD IN LANE DEPARTURE WARNING WITH EGO MOTION PREDICTION AND VISION. The contents of the above-identified patent documents are herein incorporated by reference in their entirety.

TECHNICAL FIELD

This disclosure relates generally to vehicle driver assist or autonomous driving systems. More specifically, this disclosure relates to vehicle path prediction and closest in path vehicle detection.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC) and/or auto emergency braking (AEB); blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Vehicle path prediction and closest in path vehicle detection for collision avoidance, within the vehicle's ADAS or AD features, is improved in ways suitable to EVs having higher driving and handling performance. Predicted path curvature is determined based on curvature of radius calculated with wheel speed and considering wheel-slip, but without noisy acceleration or yaw rate and fast-phased steering input. Four curvatures of radius are calculated based on wheel speed from each wheel speed sensor. The four curvatures are then converged at the front and rear axle to calculate two curvatures. Wheel slip is considered by merging the two curvatures to one representative curvature in a weighted manner based on the vehicle's longitudinal acceleration. The weighted combinations of predicted path curvature more accurately predict the vehicle's path, improving identification of the closest in path vehicle for evaluation of collision potential. Steering and/or braking actuator(s) may be activated, if necessary, to avoid collision with the identified closest in path vehicle.

In one aspect, an apparatus includes an inertial measurement unit (IMU) configured to detect motion characteristics of a vehicle. The apparatus also includes an odometry system configured to detect a wheel speed of each wheel of the vehicle. The apparatus further includes at least one processor communicatively connected to the IMU and the odometry system, the at least one processor configured to determine first parameters for predicting a path of the vehicle, determine second parameters for predicting the path of the vehicle, and predict the path of the vehicle using a combination of the first parameters and the second parameters, wherein the combination is weighted based on a longitudinal acceleration of the vehicle obtained using the IMU.

In some embodiments, the first parameters comprise a front axle curvature and the second parameters comprise a rear axle curvature.

In some embodiments, one of the front axle curvature or the rear axle curvature is a driving axle curvature, and wherein one of the front axle curvature or the rear axle curvature is a non-driving axle curvature.

In some embodiments, the weighted combination weights the driving axle curvature using a weight $\alpha$ and weights the non-driving axle curvature using according to $1-\alpha$.

In some embodiments, the weight $\alpha$ varies linearly with the longitudinal acceleration.

In some embodiments, the at least one processor is further configured to obtain, using the odometry system, the wheel speed of each wheel of the vehicle, obtain, using the IMU, a yaw rate of the vehicle, determine a wheel curvature of each front axle wheel and a wheel curvature of each rear axle wheel of the vehicle using the obtained wheel speed of each wheel and the obtained yaw rate, converge, to determine the front axle curvature, the wheel curvature of each front axle wheel based on a length between each front axle wheel, and converge, to determine the rear axle curvature, the wheel curvature of each rear axle wheel based on a length between each rear axle wheel.

In some embodiments, the apparatus further includes at least one camera configured to capture an image of a traffic lane in front of the vehicle and a radar transceiver configured to detect one or more target vehicles proximate to the vehicle. The at least one processor is further configured to identify one of the one or more target vehicles as a closest in path vehicle based on the predicted path of the vehicle and activate at least one of a braking control and a steering control based on a proximity of the identified closest in path vehicle.

In some embodiments, the at least one processor is configured to generate at least one of a braking command and a steering command based on a speed of the vehicle and the proximity of the identified closest in path vehicle.

In another aspect, a vehicle includes the apparatus and a motor configured to drive wheels of the vehicle. The vehicle also includes a chassis supporting axles on which the wheels are mounted. The steering control may be configured to generate a steering command configured to control the wheels when the steering control is activated based on the proximity of the identified closest in path vehicle. A brake actuator is configured to actuate brakes for one or more of the wheels, and the brake actuator may be configured to receive a braking control signal from the braking control when the braking control is activated based on the proximity of the identified closest in path vehicle. The vehicle may be an electric vehicle.

In another aspect, a method includes detecting motion characteristics of a vehicle using an inertial measurement unit (IMU), detecting a wheel speed of each wheel of the vehicle using an odometry system, determining first parameters for predicting a path of the vehicle, determining second parameters for predicting the path of the vehicle, and predicting the path of the vehicle using a combination of the first parameters and the second parameters, wherein the combination is weighted based on a longitudinal acceleration of the vehicle obtained using the IMU.

In some embodiments, the first parameters comprise a front axle curvature and the second parameters comprise a rear axle curvature.

In some embodiments, one of the front axle curvature or the rear axle curvature is a driving axle curvature, and wherein one of the front axle curvature or the rear axle curvature is a non-driving axle curvature.

In some embodiments, the weighted combination weights the driving axle curvature using a weight $\alpha$ and weights the non-driving axle curvature using according to 1-$\alpha$.

In some embodiments, the weight $\alpha$ varies linearly with the longitudinal acceleration.

In some embodiments, the method further includes obtaining, using the odometry system, the wheel speed of each wheel of the vehicle, obtaining, using the IMU, a yaw rate of the vehicle, determining a wheel curvature of each front axle wheel and a wheel curvature of each rear axle wheel of the vehicle using the obtained wheel speed of each wheel and the obtained yaw rate, converging, to determine the front axle curvature, the wheel curvature of each front axle wheel based on a length between each front axle wheel, and converging, to determine the rear axle curvature, the wheel curvature of each rear axle wheel based on a length between each rear axle wheel In some embodiments, the method further includes capturing an image of a traffic lane in front of the vehicle using at least one camera, detecting one or more target vehicles proximate to the vehicle using a radar transceiver, identifying one of the one or more target vehicles as a closest in path vehicle based on the predicted path of the vehicle, and activating at least one of a braking control and a steering control based on a proximity of the identified closest in path vehicle.

In some embodiments, the method further includes generating at least one of a braking command and a steering command based on a speed of the vehicle and the proximity of the identified closest in path vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Vehicle path prediction, planning, and/or control within ADAS or AD features often needs to account for the closest in path vehicle (CIPV). However, due to the characteristics of radar reflections off surrounding stationary or moving objects, detecting and tracking the object of main interest to a vehicle using ADAS or AD is difficult. Selecting the object detected by radar that is "closest" to the vehicle using ADAS or AD often needs to account for relevant information relating to the detected target vehicle(s), such as relative distance and velocity, as well as predicted path of the vehicle.

With kinematics, the curvature of the vehicle's predicted path (e.g., occupied traffic lane) can be obtained, together with the vehicle's lateral acceleration and speed, but typically needs to filter the noisy lateral acceleration and does not consider the vehicle dynamic effect. For example, lateral vehicle acceleration $A_y$ (in units of meters per second squared, [m/s$^2$]), path curvature K (in units of [m$^{-1}$]), and vehicle speed $V_x$ (in units of [m/s]) are related as:

$$A_y = \kappa \cdot V_x,$$

$$\kappa = \frac{A_y}{V_x}.$$

However, the lateral acceleration is usually noisy measurement data, and thus the information needs to be filtered for noisy lateral acceleration and the above kinematics do not consider the vehicle's dynamic effects.

Figure 4:
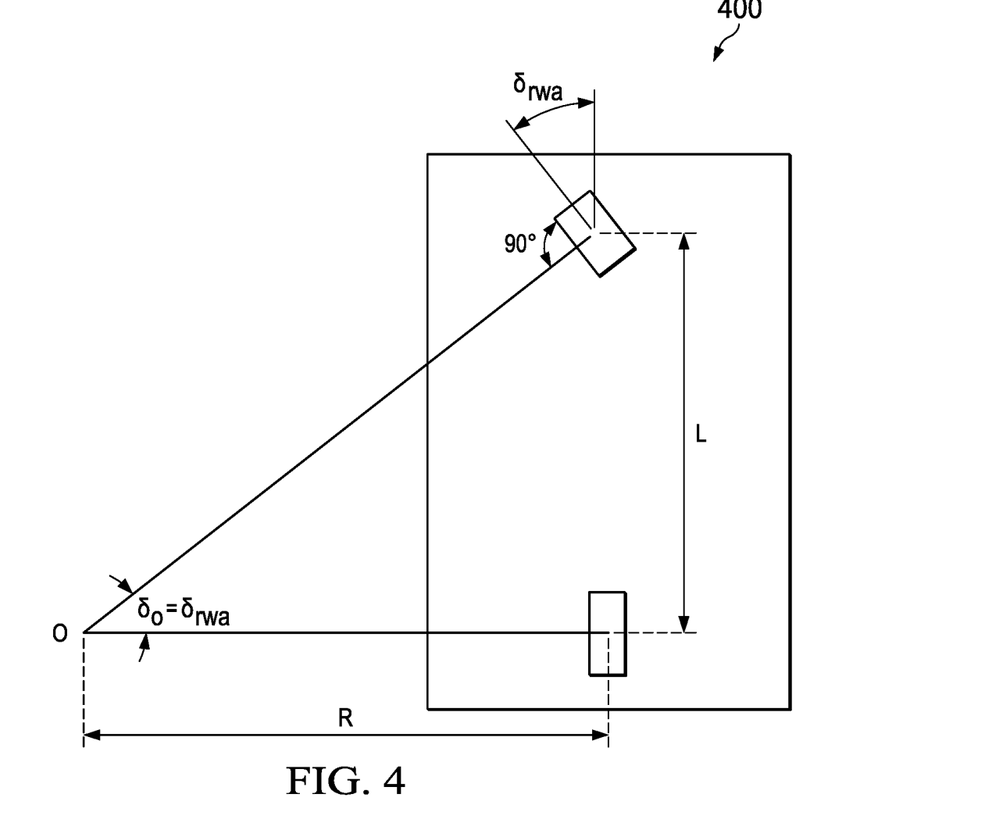
FIG. 4 illustrates an example of an Ackerman steering approach.

As illustrated in FIG. 4, Ackerman steer angle calculates path curvature from the road wheel angle $\delta_{rwa}$ (in units of radians [rad]), the turning radius R (in units of radians [rad]), and the wheelbase length L (in units of [m]) as follows:

$$\tan(\delta_{rwa}) = L/R,$$

$$\kappa = \frac{\tan(\delta_{rwa})}{L}.$$

However, there is an assumption that the radius (R) should be far larger than the wheelbase (L) so that the two angles can be identical ($\delta_{rwa}=\delta_o$). The curvature is also sensitive to the direct input of road and steering wheel angle inputs. Further, the dynamic effect at high-speed maneuvering is not reflected.

Figure 1:
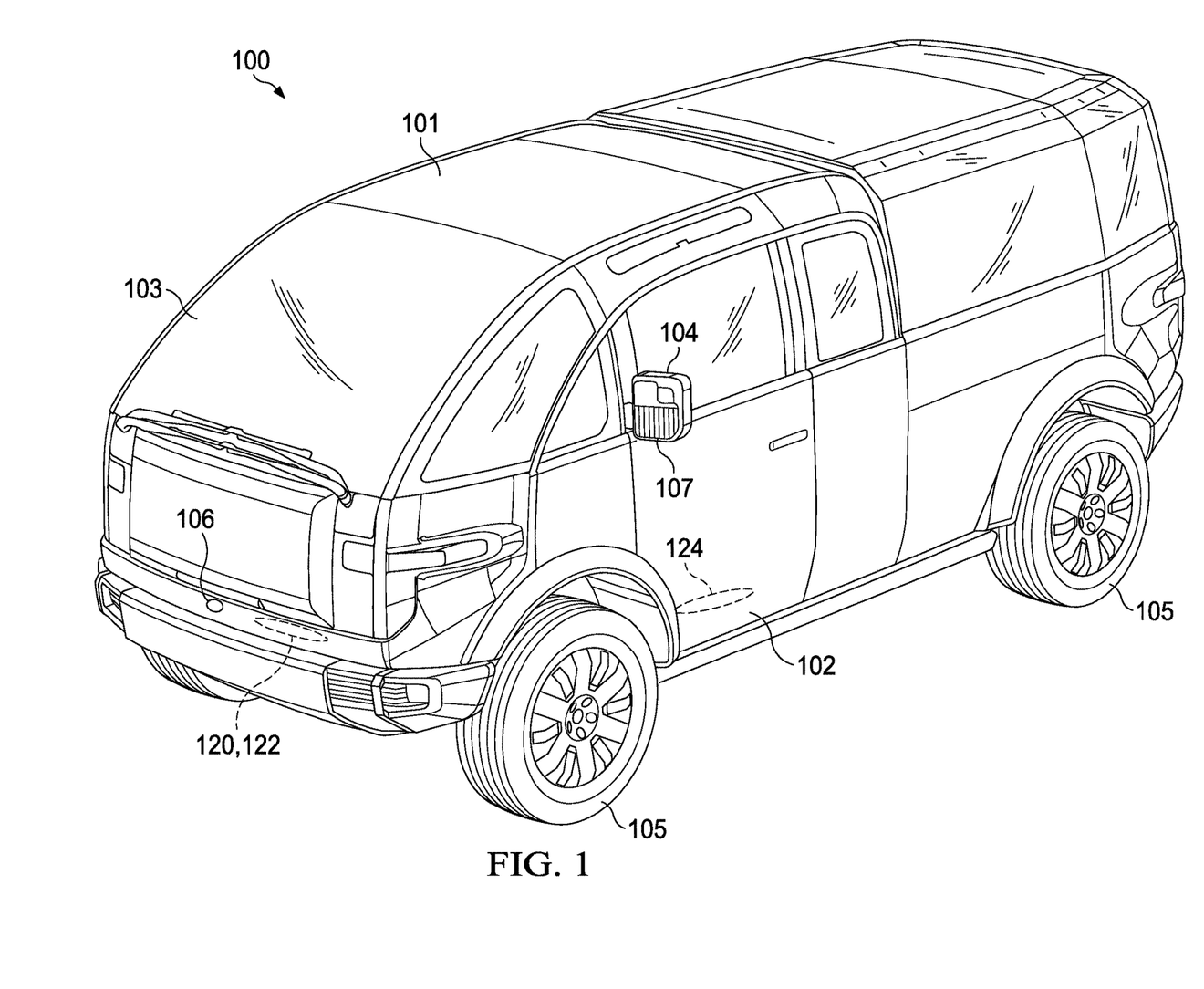
FIG. 1 is a perspective view of a vehicle within which improved vehicle path prediction and closest in path vehicle detection are implemented in accordance with embodiments of the present disclosure.

FIG. 1 is a perspective view of a vehicle 100 within which improved vehicle path prediction and closest in path vehicle detection are implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator. In addition, the vehicle 100 includes a radar transceiver 120 and an inertial measurement unit (IMU) 122 (shown in phantom in FIG. 1, as not visible from the exterior of vehicle 100). In some embodiments, the IMU 122 is a six degrees of freedom (6-DOF) IMU with three linear acceleration and three angular rate gyroscope. In addition, the vehicle 100 includes at least one wheel speed sensor (WSS) 124, such as one WSS for each wheel (shown in phantom in FIG. 1, as not visible from the exterior of vehicle 100).

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved vehicle path prediction and closest in path vehicle detection described in this disclosure may be used with any other suitable vehicle.

Figures 2, 2A:
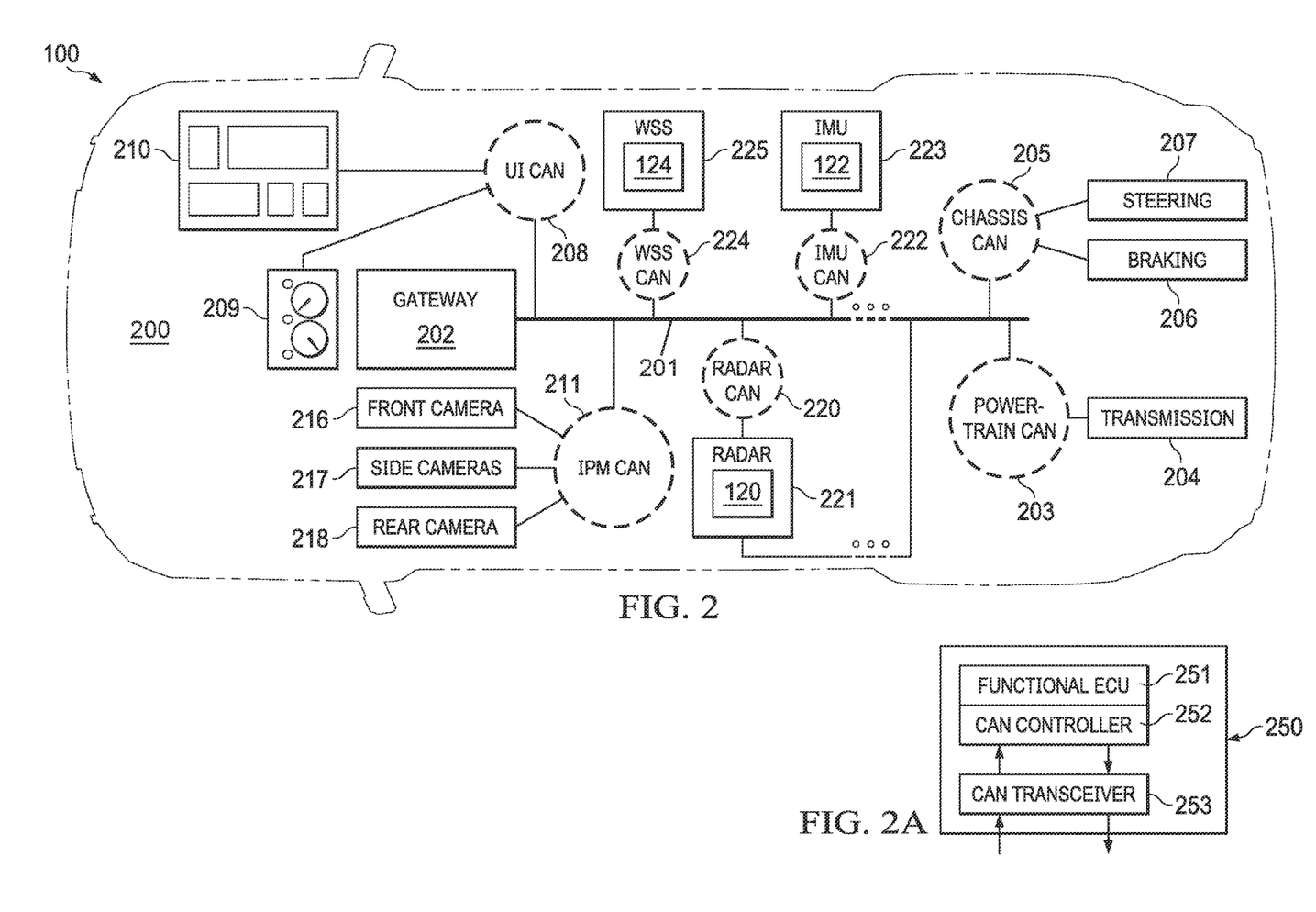
FIGS. 2 and 2A depict a vehicle control system for a vehicle within which improved vehicle path prediction and closest in path vehicle detection are implemented in accordance with embodiments of the present disclosure.

FIGS. 2 and 2A depict a vehicle control system 200 for a vehicle within which improved vehicle path prediction and closest in path vehicle detection are implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107, and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

For the present disclosure, the vehicle control system 200 also includes a radar CAN 220 to which a radar ECU 221 and a radar transceiver 120 are connected. The radar CAN 220, radar ECU 221, and radar transceiver 120 are used to detect objects around the vehicle 100 and to measure the relative distance to and velocity of those objects. For the present disclosure, the vehicle control system 200 also includes an IMU CAN 222 to which an IMU ECU 223 having an IMU 122 is connected. The IMU CAN 222, IMU ECU 223, and IMU 122 are used to detect vehicle motion such as yaw, pitch, and roll of the vehicle 100. The vehicle control system 200 also includes a WSS CAN 224 to which at least one WSS ECU 225 having a WSS 124 is connected. The WSS CAN 224, WSS ECU 225, and WSS 124 are used to detect wheel speed of the wheels of the vehicle 100 and such wheel speed detections can be used in other vehicle systems.

FIG. 2A illustrates a high level block diagram for the architecture 250 of each CAN depicted in FIG. 2. Each CAN shown in FIG. 2, including the chassis CAN 205, IPM CAN 211, radar CAN 220, IMU CAN 222, and WSS CAN 224, includes a functional ECU 251 for the specific function performed by the respective CAN (e.g., at least steering and braking in the case of the chassis CAN 205, image processing in the case of the IPM CAN 211, and vehicle motion detection in the case of the IMU CAN 220). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding the present disclosure is depicted and described. Various changes may be made to the example of FIGS. 2 and 2A, and the improved vehicle path prediction and closest in path vehicle detection described in this disclosure may be used with any other suitable vehicle control system.

To support various ADAS functions such as collision avoidance during high performance operation, the IPM CAN 211 for the vehicle 100 can accurately predict the vehicle path, and the radar CAN 220 can detect the closest in path object to determine whether collision is likely. In the present disclosure, a combination of radar and vision (with optional input from other sensors) is used to detect and track target vehicles within the ego vehicle path (where "ego" refers to the vehicle implementing the ADAS and/or AD feature(s)).

Figure 3:
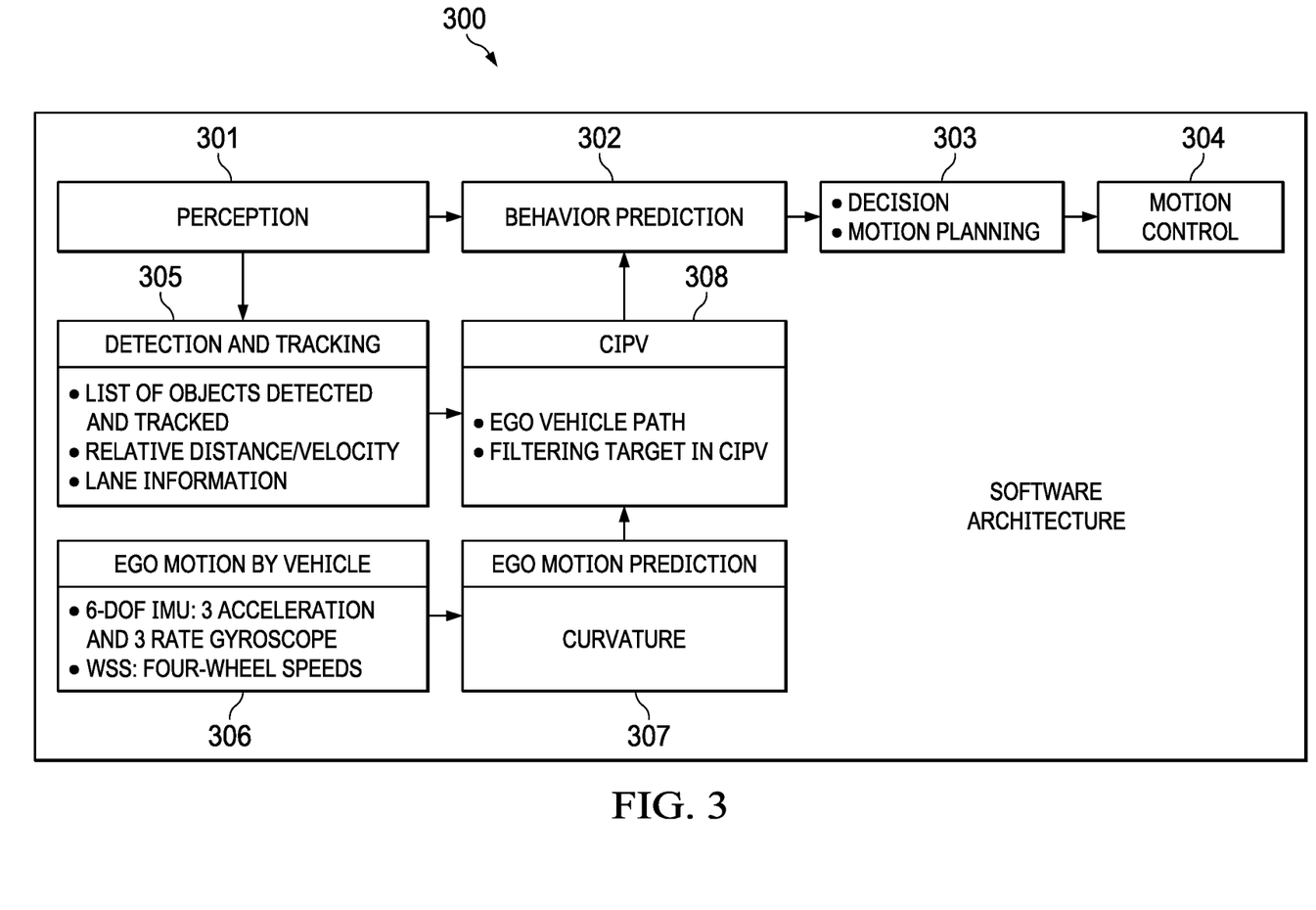
FIG. 3 illustrates a functional diagram of a system within a vehicle for performing improved vehicle path prediction and closest in path vehicle detection in accordance with embodiments of the present disclosure.

FIG. 3 illustrates a functional diagram of a system 300 within a vehicle for performing improved vehicle path prediction and closest in path vehicle detection in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by, or in connection with, the chassis CAN 205 and braking ECU 206 and steering ECU 207 in FIG. 2, including the functional (CAN) ECU 251, CAN processor/controller 252, and CAN transceiver 253 depicted in FIG. 2A for the chassis CAN 205. Lane detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 depicted in FIG. 2A for the IPM CAN 211.

Target vehicle detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, and/or the radar CAN 220, radar ECU 221, and the radar transceiver 120 depicted in FIG. 2, including the functional (CAN) ECU 251, CAN processor/controller 252, and CAN transceiver 253 depicted in FIG. 2A for the radar CAN 220. Specific functions depicted in FIG. 3 may be distributed among those components.

Vehicle path prediction for the system 300 in FIG. 3 may be implemented using, or by connection to, the IMU CAN 222, IMU ECU 223, and the IMU 122 depicted in FIG. 2, and the WSS CAN 224, WSS ECU 225, and the WSS 124 depicted in FIG. 2, including the functional (CAN) ECU 251, CAN processor/controller 252, and CAN transceiver 253 depicted in FIG. 2A for the radar CAN 220. Specific functions depicted in FIG. 3 may be distributed among those components.

To support ADAS and AD features, the system 300 includes the functions of camera and radar perception 301, ego and target vehicle behavior prediction 302, decision and motion planning 303, and motion control 304. In various embodiments, at least the behavior prediction 302, the decision and motion planning 303, and the motion control 304 is performed by one or more processors, such as the CAN processor/controller 252. Camera perception and radar 301 detects a traffic lane ahead and the relative position and velocity of other vehicles, while vehicle behavior prediction 302 determines whether the ego vehicle could potentially collide with another vehicle ahead in the ego vehicle's path based on the ego vehicle's speed, the predicted path, and the relative position and velocity of each detected target vehicle. Decision and motion planning 303 and motion control 304 respectively determine and, if necessary, implement reactive responses to the ego vehicle's possible collision with a target vehicle, such as evasive steering and/or emergency braking.

Camera perception and radar 301 performs detection and tracking 305 to determine lane information, determine and track a list of surrounding objects, the direction and distance of each object detected from the ego vehicle, and the velocity of each object relative to the ego vehicle. Objects may be identified as a target vehicle based, for example, on the relative velocity of the corresponding object. The system 300 also includes the function of ego vehicle motion 306, which determines ego motion parameters such as the ego vehicle speed, yaw rate, wheel speed, and/or longitudinal acceleration. In various embodiments, these ego vehicle parameters are be determined from the IMU and the WSS, and/or vision, radar, other sensors, or some combination thereof.

Based on the parameters of the ego vehicle motion 306, behavior prediction 302 predicts the ego vehicle's motion 307, such as path curvature of the predicted path. Using the predicted ego vehicle motion 307 and the object list from radar detection 305, behavior prediction 302 determines a closest in path vehicle 308, which involves using the ego vehicle's predicted path to filter target vehicles and determine which target vehicle is closest along the ego vehicle's predicted path.

Figure 5:
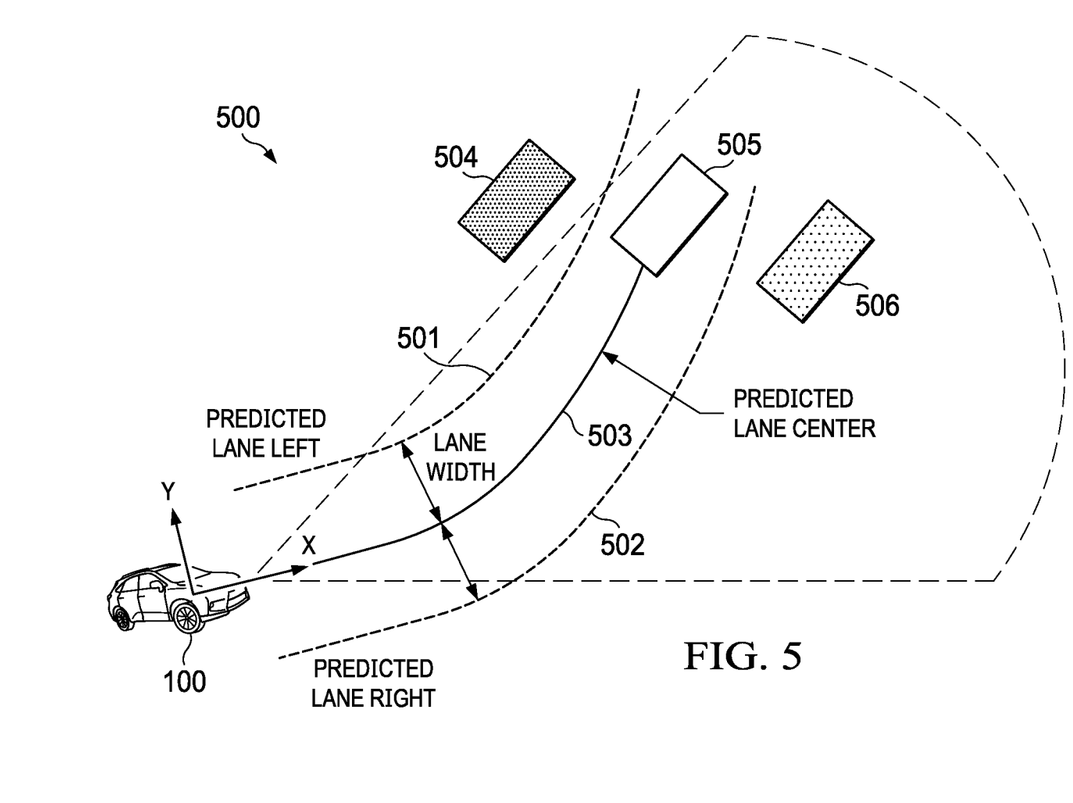
FIG. 5 illustrates a scenario for ego vehicle path prediction and target vehicle detection in accordance with embodiments of the present disclosure.

FIG. 5 illustrates a scenario for ego vehicle path prediction and target vehicle detection in accordance with embodiments of the present disclosure. The ego vehicle path prediction may be implemented as part of behavior prediction 302 and/or decision and motion planning 303. As illustrated in FIG. 5, the ego vehicle 100 generally occupies and travels within a traffic lane 500 that includes left and right lane boundaries 501, 502. In some embodiments, a predicted lane centerline 503 may serve as a reference path for ego vehicle path prediction.

Other vehicles, target vehicles 504, 505 and 506, can be detected and tracked using the camera and/or radar perception. To determine a CIPV, ego motion of the vehicle 100 can be used to predict an ego vehicle path of the vehicle 100.

Figure 6A:
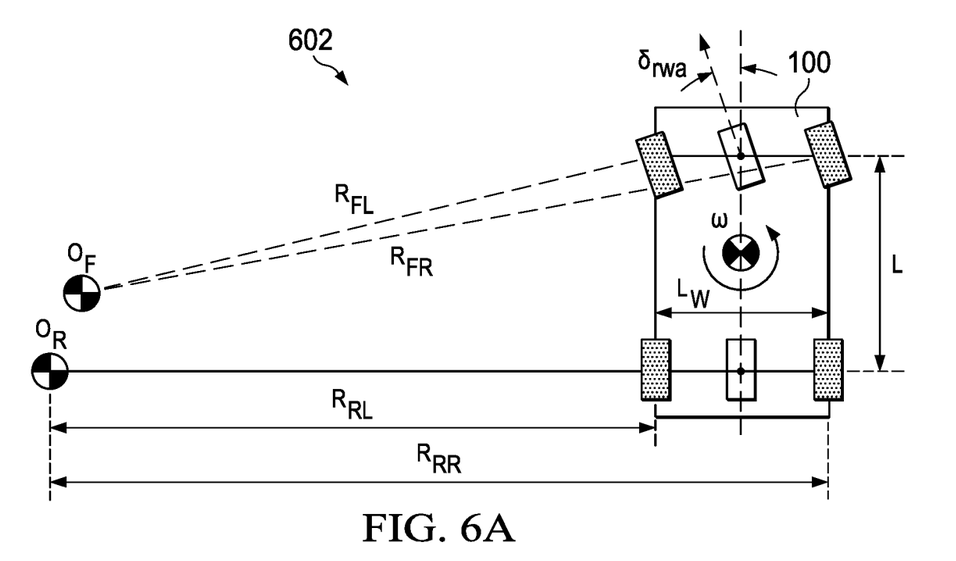
FIGS. 6A and 6B depict processing for a vehicle within which improved vehicle path prediction and closest in path vehicle detection are implemented in accordance with embodiments of the present disclosure.

FIGS. 6A and 6B illustrate example ego vehicle path prediction in accordance with embodiments of the present disclosure. As illustrated in FIG. 6A, kinematics 602 are used to predict ego motion trajectory, using curvature of radius calculated with wheel speed, while considering wheel slippage. To predict the ego motion trajectory, four curvatures of radius are calculated, one for each wheel, and the four curvatures of radius are converged into two curvatures, a front axle curvature and a rear axle curvature. To address wheel slip conditions, the front axle curvature and the rear axle curvature are merged into one representative curvature.

Particularly, using yaw rate of the ego vehicle 100 detected using the IMU 122 and the wheel speed of each wheel, such as from the odometry system of the ego vehicle 100, e.g., from input signals for the odometer within the dashboard ECU 209, detected using the wheel speed sensors 124.

In various embodiments, the above ego vehicle motion trajectory prediction is determined using, or by connection to, the IMU CAN 222, IMU ECU 223, and IMU 122, the WSS CAN 224, WSS ECUs 225, and WSSs 124 and the CAN processor/controller 252 depicted in FIG. 2. Using a detected yaw rate from the IMU and a detected speed of each wheel from the odometry system and/or the WSSs, the following kinematics can be represented:

$$R_{ij} \cdot \omega = V_{ij},$$

$$\forall_{ij} = FL, FR, RL, RR$$

where, as illustrated in FIG. 6A, $R_{ij}$ is the turn radius at each wheel at each $ij^{th}$ location, i.e., $R_{FL}$, $R_{FR}$, $R_{RL}$, and $R_{RR}$, where FL is the front left wheel, FR is the front right wheel, RL is the rear left wheel, and RR is the rear right wheel, L is the wheelbase, $L_w$ is the length between the left and right wheels at the same axle, ω is the yaw rate, i.e., the rotation rate of the ego vehicle 100, and $V_{ij}$ is the wheel speed of each wheel at each $ij^{th}$ location.

Other approaches, such as the Ackerman steer angle approach 400 disclosed herein and illustrated in FIG. 4, make an assumption that the radius (R) should be far larger than the wheelbase (L) so that the two angles depicted in FIG. 4 can be identical ($\delta_{rwa} = \delta_o$). The curvature is also sensitive to the direct input of road and steering wheel angle inputs and the dynamic effect at high-speed maneuvering is not reflected. As illustrated in FIG. 6A, center points $O_R$ and $O_F$ due instantaneous turning of the front axle and the rear axle of the ego vehicle 100 may not coincide with each other, and thus the vehicle ego motion prediction illustrated in FIG. 6A avoids assumptions concerning geometry. Additionally, in other approaches that use steering angle, such as the Ackerman steer angle approach, given that curvature calculated from steering can change rapidly in certain conditions, the inputs from steering angle can occur too rapidly to timely predict vehicle trajectory. The improved vehicle motion and trajectory prediction illustrated in FIGS. 6A and 6B avoid this issue by using wheel speed, which changes less frequently in most driving situations.

The processor then can converge the four curvatures obtained for each wheel of the ego vehicle 100. The yaw rate, ω, is usually noisy and can be inaccurate at low speeds. The improved vehicle motion and trajectory prediction of the various embodiments of this disclosure can account for this by modifying, such as by the by at least one processor such as the CAN processor/controller 252 in FIG. 2, the above kinematics as follows to determine the inverse of the radius:

$$\frac{R_i}{R_o} = \frac{V_i}{V_o} = \frac{\kappa_o}{\kappa_i}$$

where the subscript i and o indicate the inner and the outer wheel, respectively, of the same axle at turning and κ represents the corresponding curvature. Since the distance difference between inner/outer radius is the length ($L_w$) between wheels at the same axle, then:

$$R_i = R_o \frac{V_i}{V_o} = (R_i + L_w)\frac{V_i}{V_o},$$

$$R_i = \frac{L_w \cdot V_i}{V_o - V_i} \text{ and } R_o = \frac{L_w \cdot V_o}{V_o - V_i},$$

$$R = \frac{1}{2}(R_i + R_o) = \frac{L_w \cdot (V_o + V_i)}{V_o - V_i}$$

Let K=1/R be the curvature of radius at turn in the same axle, then:

$$\kappa = \frac{V_o - V_i}{L_w \cdot (V_o + V_i)}$$

In some embodiments, the denominator ($V_o+V_i$) should not be zero to avoid the divergence of curvature, and, therefore, when the ego vehicle 100 is stopped (at zero vehicle speed), the curvature is not provided. In some embodiments, when the numerator ($V_0-V_i$) approaches near zero during a non-stopping maneuver ($V_o+V_i\neq 0$), the curvature also goes to zero, indicating a straight maneuver.

Based on the above, two curvatures of radius, the curvature of the front axle and the curvature of the rear wheel axle, $K_{front}$ and $K_{rear}$, respectively, can be determined by the processor as follows:

$$\kappa_{front} = \frac{V_{FR} - V_{FL}}{L_w \cdot (V_{FR} + V_{FL})}$$

$$\kappa_{rear} = \frac{V_{RR} - V_{RL}}{L_w \cdot (V_{RR} + V_{RL})}$$

After obtaining the curvature of the front axle and the curvature of the rear axle, the processor merges the two axle curvatures into a single representative curvature while also accounting for wheel slippage. Depending on the powertrain configuration, the driving wheel can be located either at the front or rear axle. The driving wheel is usually affected by wheel slippage during slippery road conditions or during sudden acceleration or braking scenarios. The wheel slippage effect can be reduced with an index of longitudinal acceleration using weights α and 1−α as follows:

$$\kappa_{final} = \alpha \cdot \kappa_{driving} + (1-\alpha) \cdot \kappa_{non-driving}$$

where α is a varying weight according to the longitudinal acceleration ($A_x$) to reduce the effect of wheel slippage, and $K_{driving}$ is the curvature of the driving axle and $K_{non-driving}$ is the curvature of the non-driving axle. For example, in some embodiments, the driving axle is the rear axle and the non-driving axle is the front axle. In some embodiments, the driving axle is the front axle and the non-driving axle is the rear axle.

Figure 6B:
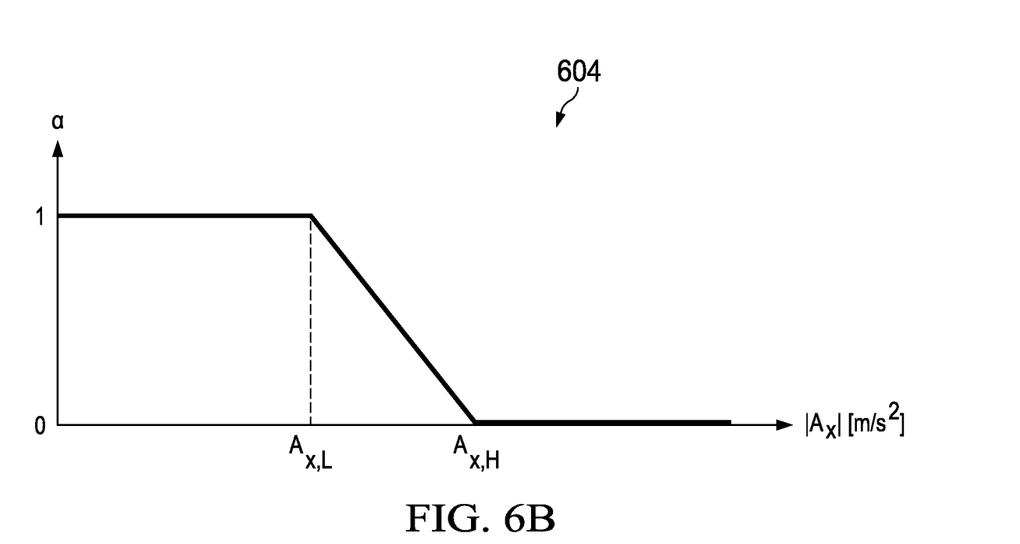

As illustrated in FIG. 6B, the longitudinal acceleration ($A_x$) (in units of meters per second squared, [m/s$^2$]) is low-pass filtered to be used for an index of the weights. The weights α and 1−α can be applied by weighting 604 based on longitudinal acceleration according to tuning parameters $A_{x,L}$ and $A_{x,H}$, where $A_{x,L}$ represents low longitudinal acceleration and $A_{x,H}$ represents high longitudinal acceleration. Using the determined path trajectory prediction, in conjunction with camera and radar CIPV detection, the closest in path vehicle from among target vehicles 504, 505 and 506 shown in FIG. 5 can be identified as target vehicle 505, for example.

Figure 7:
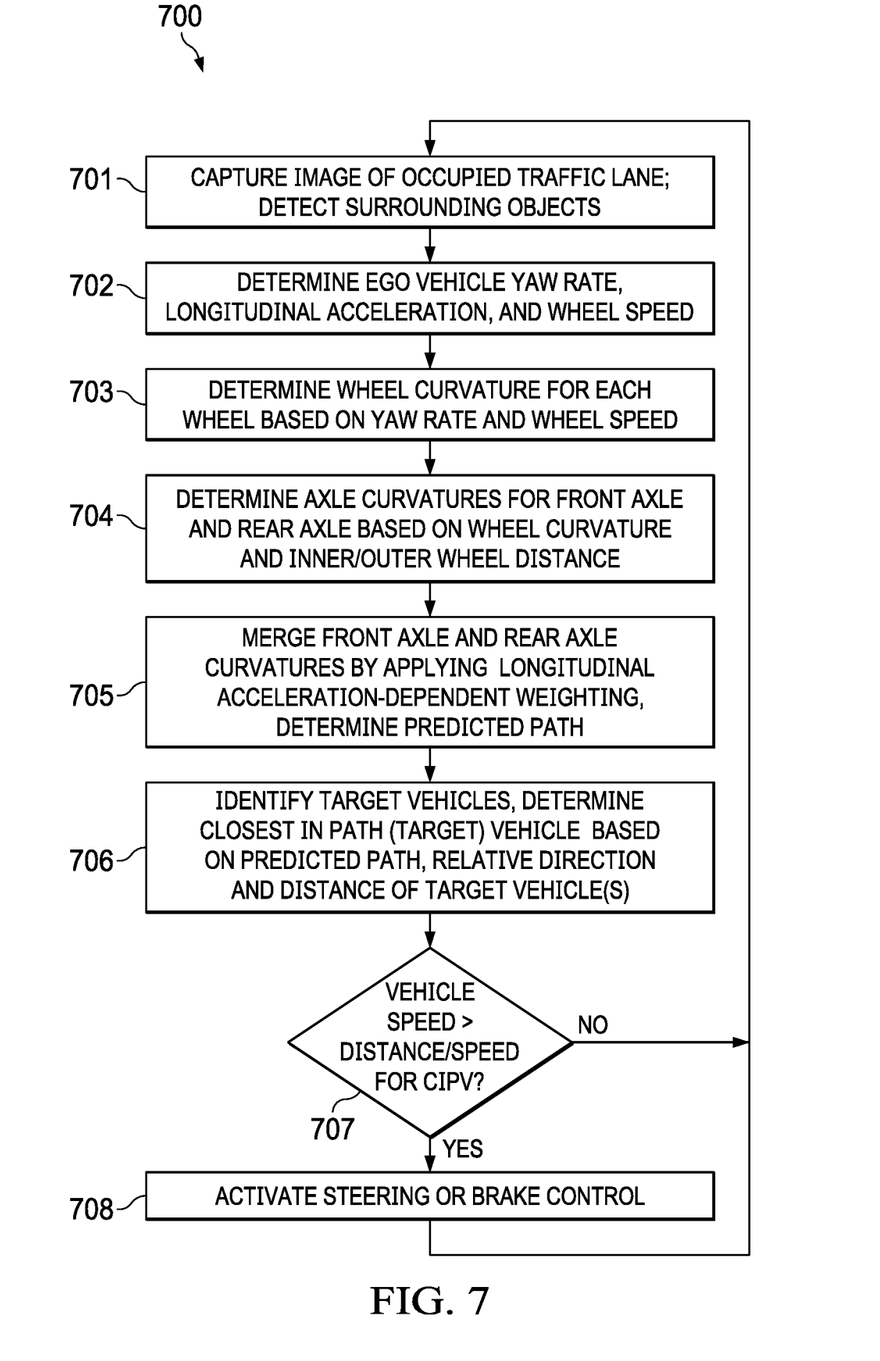
FIG. 7 illustrates an example improved vehicle path prediction and closest in path vehicle detection process in accordance with embodiments of the present disclosure.

FIG. 7 illustrates an example improved vehicle path prediction and closest in path vehicle detection process 700 in accordance with embodiments of the present disclosure. The embodiment of the process 700 illustrated in FIG. 7 is for illustration and explanation only. FIG. 7 does not limit the scope of this disclosure to any particular implementation. In some embodiments, the process 700 in FIG. 7 may be implemented using, or by connection to, the front camera 106 and the side cameras 107 in FIG. 1; the chassis CAN 205, braking ECU 206, and steering ECU 207 in FIG. 2; the IPM CAN 211, front camera ECU 216, side camera ECU 217 in FIG. 2; the radar CAN 220 and radar ECU 221 in FIG. 2, the IMU CAN 222, IMU ECU 223, and IMU 122 in FIG. 2, and the WSS CAN 224, WSS ECUs 225, and WSSs 124 in FIG. 2. The process 700 can be performed by at least one processor such as the CAN processor/controller 252 in FIG. 2 communicatively coupled with the cameras, radar transceiver, IMU, WSSs, and/or other sensors. The process 700 may be implemented using the functions depicted in FIG. 3 and the processing depicted in FIGS. 6A and 6B.

At block 701, the processor, using at least one camera mounted on the vehicle, captures at least one image of a traffic lane occupied by the vehicle, and detects objects around the vehicle using the radar transceiver. At block 702, the processor determines vehicle yaw rate and vehicle longitudinal acceleration using the IMU 122, and wheel speed from the vehicle odometry, such as detected using a WSS for each wheel. In some embodiments, the processor can also determine the vehicle lateral offset from a reference path for the lane (which may be a lane centerline, one of the lane boundaries, or a different reference path selected based on road conditions), the vehicle heading offset from the path curvature, and/or the vehicle speed are determined using any suitable techniques from the image and/or other sensor data.

At block 703, the processor uses a kinematics control (e.g., kinematics 602) to determine wheel curvatures, a curvature for each of the wheels of the vehicle. For example, the processor uses the detected yaw rate and the detected wheel speed of each wheel to determine the wheel curvature for each wheel, as described in the various embodiments of this disclosure. At block 704, the processor converges the four wheel curvatures to two axle curvatures, a rear axle curvature and a front axle curvature, as described in the various embodiments of this disclosure.

At block 705, the processor merges the front and rear axle curvatures based on which axle is the driving axle, and by applying longitudinal acceleration-dependent weighting (e.g., by weighting 604) to determine a final predicted path curvature so that the predicted path is determined. At block 706, the processor determines a CIPV based on the predicted path and relative direction and distance of each identified target vehicle. In some embodiments, the predicted path can also be used to predict an imminent lane departure.

Optionally, at decision block 707, the processor checks whether the vehicle speed (determined, for example, from the input signal for the speedometer within the dashboard ECU 209) exceeds a value determined based on distance to and speed of the closest in path vehicle. If not, another iteration of the process 700 is started. If so, at block 708, the processor activates a brake control or illuminates a warning indicator until the vehicle speed is sufficiently reduced, and another iteration of the process is started.

The determination of a vehicle curvature based on kinematics using vehicle yaw rate and wheel speeds, weighted based on longitudinal acceleration used for path prediction helps to detect and track to the closest in path target object(s) so that prediction, planning, and control may take advantage of that information. In some embodiments, radar and sensor fusion is used so there is little or no increase in cost or difficulty in manufacturability and assembly.

Many functional aspects of the present invention can be embodied as software instructions running on a unitary or multi-core central processing unit. Alternatively, functional aspects can manifest as Application Specific Integrated Circuits (ASICs). The ASIC manifestation may use integrated circuit design and manufacturing techniques commonly automated with Electronic Design Automation (EDA) tools. Exemplary but not exclusive tools may be found from companies such as, but not limited to, Synopsys, Cadence, and Mentor Graphics. The details of these EDA tools are not required for the present disclosure.

Figure 8:
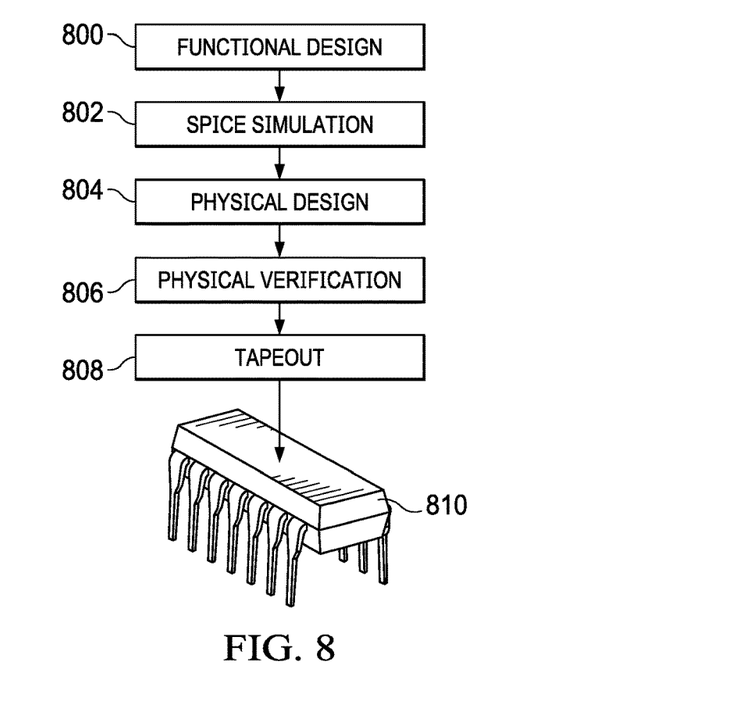
FIG. 8 illustrates a simplified general ASIC design flow employing tools for producing ASICs in accordance with embodiments of the present disclosure.

Reference is now made to FIG. 8 illustrating a simplified general ASIC design flow employing (EDA) tools for producing ASICs having embodiments of the present disclosure. At step 800, the functional design of an ASIC, which may include the improved vehicle path prediction and closest in path vehicle detection process 700, is created. For those portions of the ASIC digital in nature, the functional design is typically manifested by writing Register Transfer Level (RTL) code in a Hardware Descriptive Language (HDL) such as but not limited to, VHDL or Verilog. A functional verification (behavioral simulation) is then preferably performed on the HDL data structures to ensure the RTL design is in accordance with the logic specifications. Alternatively, a schematic of the digital logic can be captured with a schematic capture program.

For portions of the ASIC that are analog in nature, the analog functional design is typically manifested by capturing a schematic with a schematic capture program. The output of the schematic capture program is then converted (synthesized) into gate/transistor level netlist data structures.

At step 802, the data structures are simulated with a simulation program with integrated circuits emphasis (SPICE). At step 804, the data structures from step 802 are instantiated with their geometric representations and the physical layout of the ASIC is performed.

The first step in physical layout is typically so-called "floor-planning" wherein gross regions on the integrated circuit chip are assigned and input/output (I/O) pins are defined. Hard cores (e.g. arrays, analog blocks, inductors, etc.) are placed within the gross regions based on the design constraints (e.g. trace lengths, timing etc.). Clock wiring (commonly referred to as clock trees) are placed and connections between gates/analog blocks are routed. When all the elements are placed, a global and detailed routing is running to connect all the elements together. Post-wiring optimization is preferably performed to improve performance (timing closure), noise (signal integrity), and yield. The layout is modified, where possible, while maintaining compliance with the design rules set by the captive or external semiconductor manufacturing foundry of choice, to make it more efficient to produce. Such modifications may include adding extra vias or dummy metal/diffusion/poly layers.

At step 806, the physical design is verified. Design rule checking (DRC) is performed to determine whether the physical layout of the ASIC satisfies a series of recommended parameters i.e. design rules of the foundry. The design rules are a series of parameters provided by the foundry that are specific to a particular semiconductor manufacturing process. The design rules specify certain geometric and connectivity restrictions to ensure sufficient margins to account for variability in semiconductor manufacturing processes, to ensure that the ASICs work correctly. A layout versus schematic (LVS) check is preferably performed to verify the physical layout corresponds to the original schematic or circuit diagram of the design. A complete simulation is then preferably performed to ensure the layout phase is properly done.

After the layout is verified in step 806, mask generation design data typically in the form of GDSII data structures is said to "tape-out" for preparation of photomasks at step 808. The GDSII data structures are transferred through a communications medium (e.g. storage or over a network) from the circuit designer to either a photomask supplier/maker or directly to the semiconductor foundry.

At step 810, the photomasks are created and used to manufacture ASICs in accordance with principles of the present disclosure.

Some of the techniques described herein can be implemented by software stored on one or more computer readable storage medium and executed on a computer. The selected techniques could be executed on a single computer or a computer networked with another computer or computers. For clarity, only those aspects of the tools or computer germane to the disclosed techniques are described. Product details well known in the art may be omitted.

Figure 9:
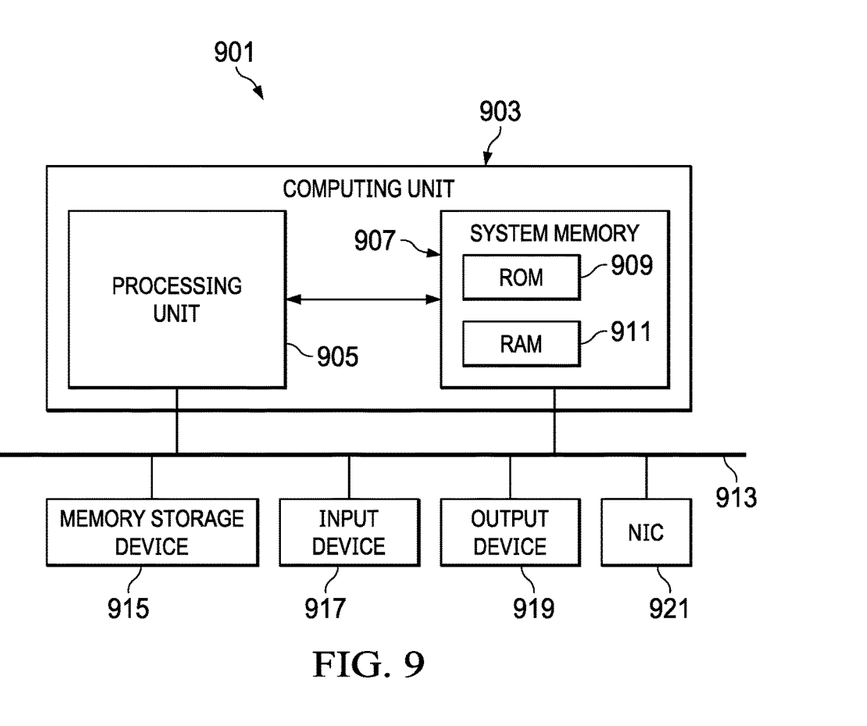
FIG. 9 illustrates an example computing device in accordance with embodiments of the present disclosure.

FIG. 9 illustrates an example computing device 901 for practicing the design flow of FIG. 8. As seen in FIG. 9, the computing device 901 includes a computing unit 903 with a processing unit 905 and a system memory 907. The processing unit 905 may be any type of programmable electronic device for executing software instructions, but will conventionally be a microprocessor. In some embodiments, the processing unit 905 can be the processor 252. The system memory 907 may include both a read-only memory (ROM) 909 and a random access memory (RAM) 911. As will be appreciated by those of ordinary skill in the art, both the read-only memory 909 and the random access memory 911 may store software instructions for execution by the processing unit 905.

The processing unit 905 and the system memory 907 are connected, either directly or indirectly, through a bus 913 or alternate communication structure, to one or more peripheral devices. For example, the processing unit 905 or the system memory 907 may be directly or indirectly connected to one or more additional memory storage devices 915. The memory storage devices 915 may include, for example, a "hard" magnetic disk drive, a solid state disk drive, an optical disk drive, and a removable disk drive. The processing unit 905 and the system memory 907 also may be directly or indirectly connected to one or more input devices 917 and one or more output devices 919. The input devices 917 may include, for example, a keyboard, a pointing device (such as a mouse, touchpad, stylus, trackball, or joystick), a scanner, a camera, and a microphone. The output devices 919 may include, for example, a display device, a printer and speakers. With various examples of the computing device 901, one or more of the peripheral devices 915-919 may be internally housed with the computing unit 903. Alternately, one or more of the peripheral devices 915-919 may be external to the housing for the computing unit 903 and connected to the bus 913 through, for example, a Universal Serial Bus (USB) connection or a digital visual interface (DVI) connection.

With some implementations, the computing unit 903 may also be directly or indirectly connected to one or more network interfaces cards (NIC) 921, for communicating with other devices making up a network. The network interface cards 921 translate data and control signals from the computing unit 903 into network messages according to one or more communication protocols, such as the transmission control protocol (TCP) and the Internet protocol (IP). Also, the network interface cards 921 may employ any suitable connection agent (or combination of agents) for connecting to a network, including, for example, a wireless transceiver, a modem, or an Ethernet connection.

It should be appreciated that the computing device 901 is illustrated as an example only, and it not intended to be limiting. Various embodiments of the invention may be implemented using one or more computing devices that include the components of the computing device 901 illustrated in FIG. 9, or which include an alternate combination of components, including components that are not shown in FIG. 9. For example, various embodiments of the invention may be implemented using a multi-processor computer, a plurality of single and/or multiprocessor computers arranged into a network, or some combination of both.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   an inertial measurement unit (IMU) configured to detect motion characteristics of a vehicle in motion;
   an odometry system configured to detect a wheel speed of each wheel of the vehicle in motion;
   at least one camera configured to capture an image of a traffic lane in front of the vehicle;
   a radar transceiver configured to detect one or more target vehicles proximate to the vehicle; and
   at least one processor communicatively connected to the IMU, the odometry system, the at least one camera, and the radar transceiver, the at least one processor configured to:
   determine first parameters for predicting a path of the vehicle in motion,
   determine second parameters for predicting the path of the vehicle in motion, wherein the first parameters comprise a front axle curvature and the second parameters comprise a rear axle curvature,
   merge the front axle curvature and the rear axle curvature to create a combination of the first parameters and the second parameters including a single representative curvature to account for wheel slippage;
   predict, during the motion of the vehicle, the path of the vehicle using the combination of the first parameters and the second parameters, wherein the combination is weighted according to a longitudinal acceleration of the vehicle obtained using the IMU;
   identify one of the one or more target vehicles as a closest in path vehicle based on the predicted path of the vehicle; and
   activate at least one of a braking control and a steering control based on a proximity of the identified closest in path vehicle.

2. The apparatus of claim 1, wherein one of the front axle curvature or the rear axle curvature is a driving axle curvature, and wherein one of the front axle curvature or the rear axle curvature is a non-driving axle curvature.

3. The apparatus of claim 2, wherein the weighted combination weights the driving axle curvature using a weight $\alpha$ and weights the non-driving axle curvature according to $1-\alpha$.

4. The apparatus of claim 3, wherein the weight $\alpha$ varies linearly with the longitudinal acceleration.

5. The apparatus of claim 4, wherein the at least one processor is further configured to:
   obtain, using the odometry system, the wheel speed of each wheel of the vehicle;
   obtain, using the IMU, a yaw rate of the vehicle;
   determine a wheel curvature of each front axle wheel and a wheel curvature of each rear axle wheel of the vehicle using the obtained wheel speed of each wheel and the obtained yaw rate;

converge, to determine the front axle curvature, the wheel curvature of each front axle wheel based on a length between each front axle wheel; and converge, to determine the rear axle curvature, the wheel curvature of each rear axle wheel based on a length between each rear axle wheel.

6. The apparatus of claim 1, wherein the at least one processor is further configured to:

obtain, using the odometry system, the wheel speed of each wheel of the vehicle;

obtain, using the IMU, a yaw rate of the vehicle;

determine a wheel curvature of each front axle wheel and a wheel curvature of each rear axle wheel of the vehicle using the obtained wheel speed of each wheel and the obtained yaw rate;

converge, to determine the front axle curvature, the wheel curvature of each front axle wheel based on a length between each front axle wheel; and converge, to determine the rear axle curvature, the wheel curvature of each rear axle wheel based on a length between each rear axle wheel.

7. The apparatus of claim 1, wherein the at least one processor is configured to generate at least one of a braking command and a steering command based on a speed of the vehicle and the proximity of the identified closest in path vehicle.

8. A vehicle comprising the apparatus of claim 1, the vehicle further comprising:

a motor configured to drive wheels of the vehicle;

a chassis supporting axles on which the wheels are mounted, the steering control configured to generate a steering command configured to control the wheels when the steering control is activated based on the proximity of the identified closest in path vehicle; and a brake actuator configured to actuate brakes for one or more of the wheels, the brake actuator configured to receive a braking control signal from the braking control when the braking control is activated based on the proximity of the identified closest in path vehicle.

9. The vehicle of claim 8, wherein the vehicle is an electric vehicle and the motor is an electric motor.

10. A method, comprising:

detecting motion characteristics of a vehicle in motion using an inertial measurement unit (IMU);

detecting a wheel speed of each wheel of the vehicle in motion using an odometry system;

determining first parameters for predicting a path of the vehicle in motion;

determining second parameters for predicting the path of the vehicle in motion, wherein the first parameters comprise a front axle curvature and the second parameters comprise a rear axle curvature;

merging the front axle curvature and the rear axle curvature to create a combination of the first parameters and the second parameters including a single representative curvature to account for wheel slippage;

predicting, during the motion of the vehicle, the path of the vehicle using a combination of the first parameters and the second parameters, wherein the combination is weighted according to a longitudinal acceleration of the vehicle obtained using the IMU;

capturing an image of a traffic lane in front of the vehicle using at least one camera;

detecting one or more target vehicles proximate to the vehicle using a radar transceiver;

identifying one of the one or more target vehicles as a closest in path vehicle based on the predicted path of the vehicle; and activating at least one of a braking control and a steering control based on a proximity of the identified closest in path vehicle.

11. The method of claim 10, wherein one of the front axle curvature or the rear axle curvature is a driving axle curvature, and wherein one of the front axle curvature or the rear axle curvature is a non-driving axle curvature.

12. The method of claim 11, wherein the weighted combination weights the driving axle curvature using a weight $\alpha$ and weights the non-driving axle curvature according to $1-\alpha$.

13. The method of claim 12, wherein the weight $\alpha$ varies linearly with the longitudinal acceleration.

14. The method of claim 13, further comprising:

obtaining, using the odometry system, the wheel speed of each wheel of the vehicle;

obtaining, using the IMU, a yaw rate of the vehicle;

determining a wheel curvature of each front axle wheel and a wheel curvature of each rear axle wheel of the vehicle using the obtained wheel speed of each wheel and the obtained yaw rate;

converging, to determine the front axle curvature, the wheel curvature of each front axle wheel based on a length between each front axle wheel; and converging, to determine the rear axle curvature, the wheel curvature of each rear axle wheel based on a length between each rear axle wheel.

15. The method of claim 10, further comprising:

obtaining, using the odometry system, the wheel speed of each wheel of the vehicle;

obtaining, using the IMU, a yaw rate of the vehicle;

determining a wheel curvature of each front axle wheel and a wheel curvature of each rear axle wheel of the vehicle using the obtained wheel speed of each wheel and the obtained yaw rate;

converging, to determine the front axle curvature, the wheel curvature of each front axle wheel based on a length between each front axle wheel; and converging, to determine the rear axle curvature, the wheel curvature of each rear axle wheel based on a length between each rear axle wheel.

16. The method of claim 10, further comprising generating at least one of a braking command and a steering command based on a speed of the vehicle and the proximity of the identified closest in path vehicle.

* * * * *